United States Patent [19]

Steely et al.

[11] Patent Number: 5,477,111
[45] Date of Patent: Dec. 19, 1995

[54] TRIAC DRIVE FOR LIGHTING AND FOR INDUCTIVE LOAD CONTROL

[75] Inventors: Lee W. Steely, Mohnton, Pa.; Darryl J. Bryans, Washington, D.C.; Lance B. Jump, Gaithersburg, Md.

[73] Assignee: The Whitaker Corporation, Wilmington, Del.

[21] Appl. No.: 218,964

[22] Filed: Mar. 28, 1994

[51] Int. Cl.⁶ .................................................. H05B 37/02
[52] U.S. Cl. ........................ 315/194; 315/292; 315/294; 315/324; 323/320
[58] Field of Search ...................................... 315/291, 307, 315/292, 294, 324, 194, 195; 323/320

[56] References Cited

U.S. PATENT DOCUMENTS

| | | | |
|---|---|---|---|
| 4,359,670 | 11/1982 | Hosaka et al. | 315/307 |
| 4,388,567 | 6/1983 | Yamazaki et al. | 315/195 |
| 4,396,869 | 8/1983 | Rosenbaum et al. | 315/194 |
| 4,649,323 | 3/1987 | Pearlman et al. | 315/307 |
| 4,876,498 | 10/1989 | Luchaco et al. | 323/300 |
| 4,954,768 | 9/1990 | Luchaco et al. | 323/300 |
| 5,218,552 | 6/1993 | Stirk et al. | 364/492 |
| 5,382,516 | 2/1994 | Lohoff | 323/322 |

OTHER PUBLICATIONS

David A. Bell, Electronic Devices & Circuits, 1980, pp. 346–361.
Timothy J. Maloney, Industrial Solid–State Electronics, 1979, pp. 180–207.

Primary Examiner—Robert J. Pascal
Assistant Examiner—Michael Shingleton

[57] ABSTRACT

A dimmer for use in lighting control in which a triac control circuit in included which allows for control of both incandescent and low voltage lighting systems at low and high intensities 142,144. The triac control circuit includes a microcontroller 130 which alters the duration of the gate triggering pulse for the triac 134 based upon the desired intensity level of the load. This dimmer is used in a lighting control system and the dimmer is responsive to a system controller 2 as well as to momentary switch inputs which are made directly to the dimmer. The triac control circuit can also be used with other inductive loads.

21 Claims, 8 Drawing Sheets

TRIAC DRIVE FOR LIGHTING AND FOR INDUCTIVE LOAD CONTROL

FIELD OF THE INVENTION

This invention relates to the use of a triac for dimming lighting loads and for power control of inductive loads, including dimming of low voltage lighting systems.

BACKGROUND OF THE INVENTION

Devices for dimming lights in alternating current power distribution systems include variable transformers, rheostats, silicon controlled rectifiers and triacs. Triacs are especially useful for dimming lighting loads by remote control, by touch input devices and by the use of low voltage switches.

A triac is a semiconductor device of the thyristor family which shows inherent ON-OFF behavior, as opposed to a gradual change in conduction. Unlike a silicon controlled rectifier, a triac can carry current in two opposite directions. Triacs are three terminal devices having two main terminals and a gate terminal. Triacs can be gated into the ON state and can carry current in either direction. While ON there is a very low resistance path from one main terminal to the other, with the direction of current flow depending on the polarity of the applied voltage. However, when a triac is turned OFF, no current can flow between the main terminals in either direction.

Since a triac can carry current in either direction, it is not limited to conduction only during 180 degrees per cycle, but can conduct for up to the full 360 degrees per cycle. A triac is used to control the average current flow to a load, and the average current delivered to a load can be varied by varying the amount of time during each cycle in which the triac is in the ON state.

A triac is triggered to the ON state by current through the gate. This gate current required to trigger the triac flows in opposite directions depending upon the relative polarity on the main terminals of the triac. A triac does not require continuous gate current once it has been fired. The triac will remain in the ON state until the main terminal polarity changes or until the main terminal current drops below the holding current. Holding current is defined as the minimum current between the main terminals of a triac below which the triac will be turned OFF. The average current through the triac can be reduced by delaying the time, after zero crossing for each half cycle, at which the triggering current is applied. The portion of the half cycle prior to application of the triggering current, during which current does not flow across the main terminals is referred to as the firing delay angle.

The use of a triac as a latching switch between a 60 hertz alternating voltage source and a load, such as an incandescent light, is illustrated in U.S. Pat. No. 4,396,869. A control voltage is applied to the triac in response to two counters and a level-setting voltage applied to the triac control circuit. The variation in the voltage applied to an incandescent light can be applied both up and down in response to the time in which the same control motion is applied.

There are a number of ways in which the phase angle of the triac gate can be changed to control the average power applied to the load. The use of a microcomputer to determine the phase angle for establishing the intensity of a load controlled by a triac is shown in U.S. Pat. No. 4,359,670.

Another means of controlling the average current delivered to a load is to use a specially designed microchip to regulate the application of a gate current LSI Computer Systems Inc. of Melville, N. Y. manufactures an integrated circuit which can be configured to respond to a single switch input to vary the phase angle or the firing angle delay. One such integrated circuit is commercially available as LSI Part Number LS7232. Another integrated circuit dimmer chip is available from LSI with the part designation SHD20051A. This latter chip can be used with a switch having separate up and down low voltage switch inputs and a triac in a dimming block which also includes means for using the line voltage to generate the low voltage inputs to the dimmer chip. This device, however, cannot be remotely controlled from a system controller such as those used in home automation systems or in programmable lighting systems. One such system controller is disclosed in U.S. Pat. No. 5,218,552. That system controller can be used to control a smart dimmer block attached to a fixture to be dimmed in the following manner. When the dimmer block is commanded to go to a selected dim percentage, system controller software issues two momentary ON commands followed by maintained OFF or down commands until the dimmer is at the desired percentage. However, it is further desirable that this dimmer block also be controlled independently of the system controller, for example directly from a low voltage switch which can operate even when the system controller is not active. The system controller can therefore not know the exact level of the fixture attached to the block. Therefore the system controller first causes the intensity of the light fixture to increase to full ON before ramping down to a desired intensity level. Such action is objectionable because users wish to directly change the intensity from the preexisting level to the intended level without going to full bright.

The triacs employed in the prior art present one other disadvantage. With current triggering or gate control circuits, triacs cannot be reliably used to control inductive loads. Therefore the dimmer blocks using conventional triggering circuits cannot be used to vary the speed of small motors, such as fan motors, nor can they be used to dim low voltage lights which employ step down transformers to change the voltage from line level, such as 120 Volts AC normally used in the United States, to the 12 Volts AC which is normally used with high intensity halogen low voltage lighting.

SUMMARY OF THE INVENTION

The current invention overcomes these shortcomings of the prior art by employing a small relatively inexpensive microprocessor to supply the gate input to regulate a triac control of both conventional incandescent lighting and inductive loads, such as small motors and low voltage lighting systems using step down transformers.

The current invention also can be employed with system controllers and other remote control systems to several selectable modes for controlling a load including the capability of ramping the intensity directly between a current level and a new level without first having to move to a predetermined reference level, such as full on or full off.

The current invention also can be directly controlled from low voltage switches having separate up and down inputs and the dimmer block modes can also be reset directly by a combination of inputs directly from simple low voltage switches. Resetting the mode does not require reconfiguration by means of the system controller.

The current invention also uses a simple microprocessor to select various dimming modes having different characteristics such as total ramping time between full intensity and full off and to compensate for the nonlinear characteristics of a load.

The invention represented by the preferred embodiment disclosed herein is a dimmer for controlling the power delivered to a load from a source of line voltage and alternating current. The dimmer includes a triac responsive to triggering gate currents applied at a phase angles during each half cycle of the alternating current so that the amount of power applied to the load corresponds to the phase angle at which the triggering gate current is applied. The dimmer also includes a circuit which varies the duration during which the triggering gate current is applied to the triac during each half cycle. This circuit is implemented as a microcontroller with appropriate software in the preferred embodiment of this invention. At greater intensity levels, the duration of the triggering gate pulse is longer to alleviate problems encountered with inductive loads. In the preferred embodiment of this invention, triggering gate pulses of two durations are used. A shorter gate pulse is used at intensity levels below one-half and a longer gate pulse is used at intensity levels above one-half.

The microcontroller which controls the inputs to the triac in this dimmer triac control circuit can also be programmed to account for nonlinear characteristics in triacs and loads as well as providing for different modes in which the output of the dimmer differs for the same inputs.

DETAILED DESCRIPTION OF THE PREFERRED EMBODIMENT

The dimmer of this invention in its preferred embodiment can be employed with a number of electrical systems, but it is specifically intended for use with an integrated system for the distribution and control of electrical power within a building. This integrated system is particularly useful in residential and light commercial construction. This system is described more fully in U.S. Pat. No. 5,218,552, which is incorporated herein by reference.

Figure 1:
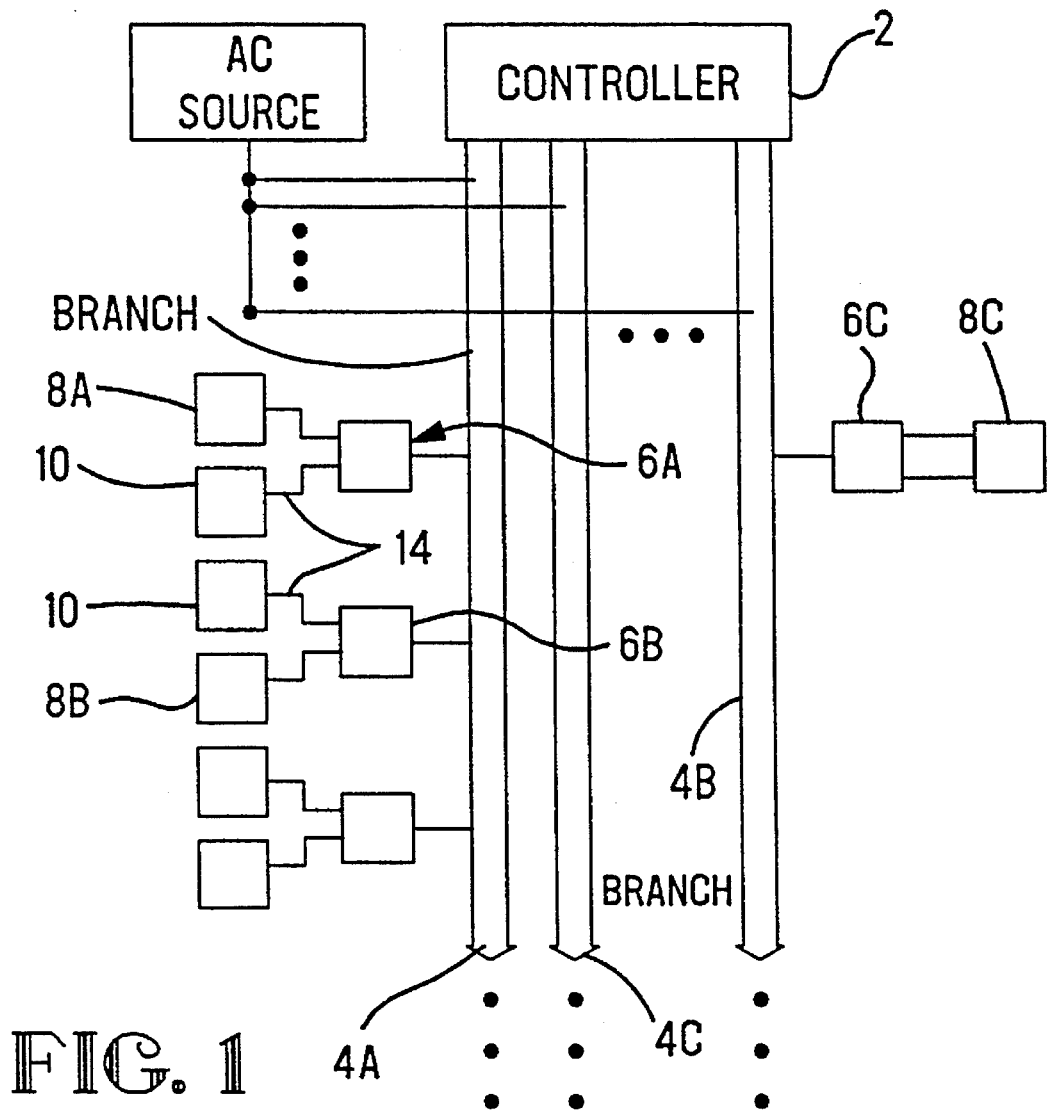
FIG. 1 is a schematic showing the basic elements of an electrical system in which a low voltage switch having the attributes of the instant invention can be used.

As shown in FIG. 1, this system employs a system controller 2 which is connected with a plurality of branches represented by three branches 4A, B,C. These branches can employ both conductors for distributing power and separate signal conductors. For example the cables used in this system employ three 12 or 14 AWG copper conductors for the distribution of 15 or 20 Amps at a voltage of 120 VAC. These cables also include signal conductors. In the preferred embodiment, six signal conductors are located in the same cable as the larger power conductors.

Each of these branches includes a number of individually addressable branch interfaces, here represented by three blocks 6A and 6B on branch 4A and block 6C on branch 4B. More branches and more branch interfaces would be employed in actual implementation of this system. It should be understood that this system can employ blocks 6 which can either employ a triac for dimming or can employ a relay for switching power. Other blocks which are merely used to control signal interfaces can also be used in this system. For purposes of description only, it will be assumed that block 6A is a dimmer block while the other blocks are blocks of different types. It should be understood, however, that numerous dimmer blocks can be used in this system. Although the triacs used in block 6A are conventional and of the same type as those used in the prior art, the current passing through these triacs is controlled by different means.

Each or all of the blocks or branch interfaces 6A, B,C depicted herein can include triacs to control the electrical power delivered to fixtures 8A, B,C. Switches 10 attached to branch interface blocks 6 provide input to the system controller to initiate transmission of a downstream signal in accordance with the programming resident in the system controller memory. In the preferred embodiment of this invention, this upstream signal transmission is implemented in a polling scheme.

In this preferred embodiment of this invention, a fixture may be dimmed in response to control signals from a system controller 2 described in U.S. Pat. No. 5,218,552. This system uses a master-slave topology in which the system controller is the master. In this system, the system controller 2 contains a branch master which is capable of controlling a plurality of branch slave devices or interfaces. The instant invention would be used in one of the branch slave devices.

A branch slave interface chip, of the type described in U.S. Pat. No. 5,218,552, would be used to receive control signals from the system controller and to transmit corresponding signals to the microprocessor or microcontroller which would be used in this embodiment of the invention. The branch slave interface chip, the triac and the microprocessor or microcontroller would be components of the same device, which can be referred to as dimmer block 6A. One typical way in which a fixture would be dimmed with this system would start with an input to the system controller. This input to the system controller could come from a low voltage switch which could be attached at another branch location in the system. In response to the some characteristic of this low voltage switch input signal, such as its duration or the number of distinct pulses, the system controller would construct a signal for use by the dimming circuit comprising this invention. In the preferred embodiment of this invention, this signal would be constructed by using two control bits. The first bit would be transmitted repeatedly until the system controller determined that the dimmed fixture had reached a state corresponding to a known condition, such as full intensity. Then a second bit would be transmitted by the system controller by a time sufficient to bring the dimmer to the state corresponding to the desired intensity level for the dimmed fixture. In the preferred embodiment of this invention, the microcontroller or microprocessor used in the dimming device 6A contains logic which intercepts these two bits so that it is not necessary to actually bring the dimmed fixture to full intensity before bringing the dimmed fixture to the desired intensity level.

The dimmer block which is used in the preferred embodiment of this invention is not solely dependent on the system controller for signal inputs. A low voltage switch attached directly to the branch slave interface chip can be used as a control input to the dinner circuit and the system controller can be bypassed. This use of a physically attached switch in this manner is especially useful if the system controller is temporarily out of order. The dimmer circuit will respond to the same characteristic input from a programmed switch communicating first with the system controller or with a switch attached directly to the branch slave interface chip in the same manner. It should of course be understood that other human or nonhuman inputs could be used with this dimmer circuit. For example the system controller could be preprogrammed to send a specific signal to the dimmer block 6A at a prescribed time of day.

Figure 2:
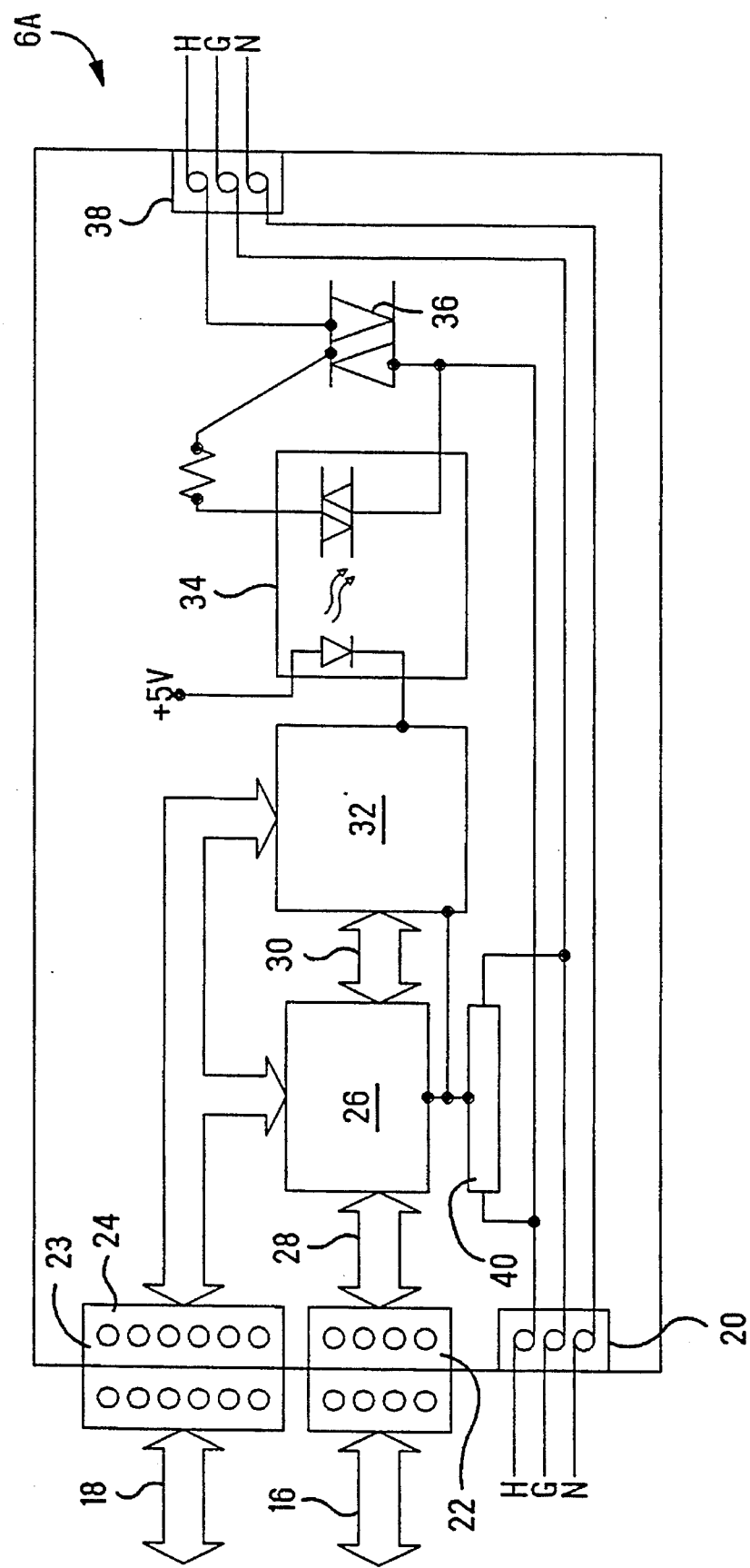
FIG. 2 shows the components of a dimming device which can be used in the system of FIG. 1 and which has a triac control circuit which can be used to dim incandescent and inductive loads.

FIG. 2 shows the basic components for implementing the preferred embodiment of this invention in the dimmer block 6A. Dimmer block 6A is used to alter the current flowing to a load attached to the dimmer block at output terminals 38. Dimmer block 6A is equipped with terminals for connecting the dimmer block to three input circuits. Termination or junction 20 provides an interconnection to a 120 VAC, 60 hertz, 15 or 20 amp supply. This junction would normally employ terminals to connect the block to either 12 or 14 AWG branch conductors suited for distributing this current. Three conductors, hot, neutral and ground are shown. Termination or junction 22 connects the block to four signal conductors 16 which transmit control signals from a central controller 2 in the system described in U.S. Pat. No. 5,218, 552. These signal conductors are the physical embodiment of branch 4A of FIG. 1. As shown in FIG. 2, these branch signal conductors 4A conduct signals between the system controller 2 and the dimmer block 6A in upstream and downstream directions. Clock and data signals can be transmitted on these branch signal conductors. Termination or junction 24 connects the dimmer block 6A to a low voltage switch or sensor, not shown, which provides a hardwired control input to the dimmer block. "Junctions 22 and 24 comprise two separate input means to the dimmer block 6A." The switch or sensor is connected to the dimmer block 6A by multiple data wires 18. In the preferred embodiment, six conductors are included in the low voltage data channel. These six conductors can establish parallel communication between the dimmer block 6A and the switch or sensor. In the preferred embodiment, the status of the switch or sensor can be determined by the voltage level on multiple lines. For example, three lines can be employed to communicate ON and OFF status information to the dimmer block 6A. For example, the OFF state could be characterized by a high, low, low state on the three selected lines. The ON state could be characterized by a low, low, high state. A three position switch having a Neutral position could be characterized by a status of high, low, high for these same three conductors. Since the last of these three lines goes low when going to the OFF state from the neutral state, this line alone could be used to signal the dimmer block that the switch or sensor has gone into the OFF state. For the ON state the first line goes low when going from the Neutral to the ON state. This line can then be sensed to signal the dimmer block that an ON state has been input at the switch or sensor.

Branch interface chip 26 implements the branch interface substantially as described in U.S. Pat. No. 5,218,552. This branch interface chip 26 is a slave chip responsive to a branch master in the system controller 2. In the system described herein for use with the preferred embodiment of this invention, this branch interface chip 26 comprises a 44 pin CMOS chip. Clock and data signals are input into the branch interface chip 26 over conductors 28. Both upstream and downstream data are communicated between the system controller 2 and the branch interface chip 26. Along with other data, two bits are transmitted from the system controller to dimmer block branch interface chip 26 when the intensity of the fixture attached to the dimmer block is to be altered. Since each branch interface chip has a unique address, the state of these two bits during the time slot assigned to the particular address of the branch interface chip 26, and therefore the dimmer block 6A, is used by the system controller to inform the dimmer block 6A of a new intensity. Since the intensity level of the dimmed fixture may be unknown to the system controller because it has been locally controlled, the data sent by the system controller is intended to be used by the dimmer block 6A to first raise the level of the dimmed fixture to full intensity, a known state, and then to lower the intensity to the desired level. The system controller thus sends a first bit for a time sufficient to raise the intensity level to the maximum level, regardless of the preexisting level. The second bit is then sent for a time sufficient to lower the intensity to the desired level. As will be subsequently described, the dimmer block incorporating the instant invention does not first raise the intensity level to full bright, and then dim the fixture to the desired level. Instead the information imparted by these two bits is used by dimmer block 6A to determine the desired intensity level and then to change the intensity level directly from the preexisting level to the desired level without first going to the intermediate full intensity level.

These two bits are detected by the branch interface chip 26 and output to a microcontroller 32, along with other signals, over data lines 30. In the preferred embodiment of this invention, microcontroller 32 comprises a CMOS 8 bit microcontroller. A Zilog Z86C08 microcontroller with 2 Kbytes of ROM and 124 bytes of general purpose RAM can be employed. This microcontroller is configured under software control to provide appropriate I/0, timing and status signals to implement the features of dimmer block 6A described herein. It is the software in this microcontroller which uses the two bits, previously described, received first by the branch interface chip 26 and then retransmitted to the microcontroller 32 to determine the desired intensity level of the dimmed fixture without the necessity of cycling the intensity level under the direct control of the system controller 2.

Upon receiving these two control bits from the branch interface chip 26, the microcontroller 32 then causes one line to go low in order to activate optocoupler 34 in response to the information represented by these two control bits, as well as from other inputs. In the preferred embodiment of this invention, an IL420 optocoupler is used. The output of optocoupler 34 is supplied to the gate input of triac 36. Triac 36 then controls the load attached to dimmer block 6A as triggered by this gate current. The main terminals of triac 36 are connected to the hot line (H) connected to a 120 VAC, 60 hertz supply so that the load attached at terminals 38 can be dimmed.

In order to properly control the load, other inputs to the microcontroller 32 are necessary. A zero crossing circuit 40 is employed in dimmer block 6A. The zero crossing circuit 40 provides AC line voltage synchronization so that the microcontroller 32 can cause a pulse to be applied to triac 36 at the appropriate time and for the appropriate duration during each half cycle of the AC line voltage. In the dimmer block 6A, this zero crossing circuit uses a 1N4006 diode and a 4N32 optoisolator with Darlington output and an MMBT3904 bipolar transistor.

In addition to inputs from the branch interface chip 26, microcontroller 32 also receives inputs from low voltage switches and or sensors over the parallel channel 18. Signals from channel 18 are input both into the branch interface chip 26 and the microcontroller 32. It is these signals which can be used by the microcontroller 32 to change operational modes of the dimmer block 6A and to provide direct inputs to the dimmer block 6A to change the intensity level of the dimmed fixture.

Figure 3B:
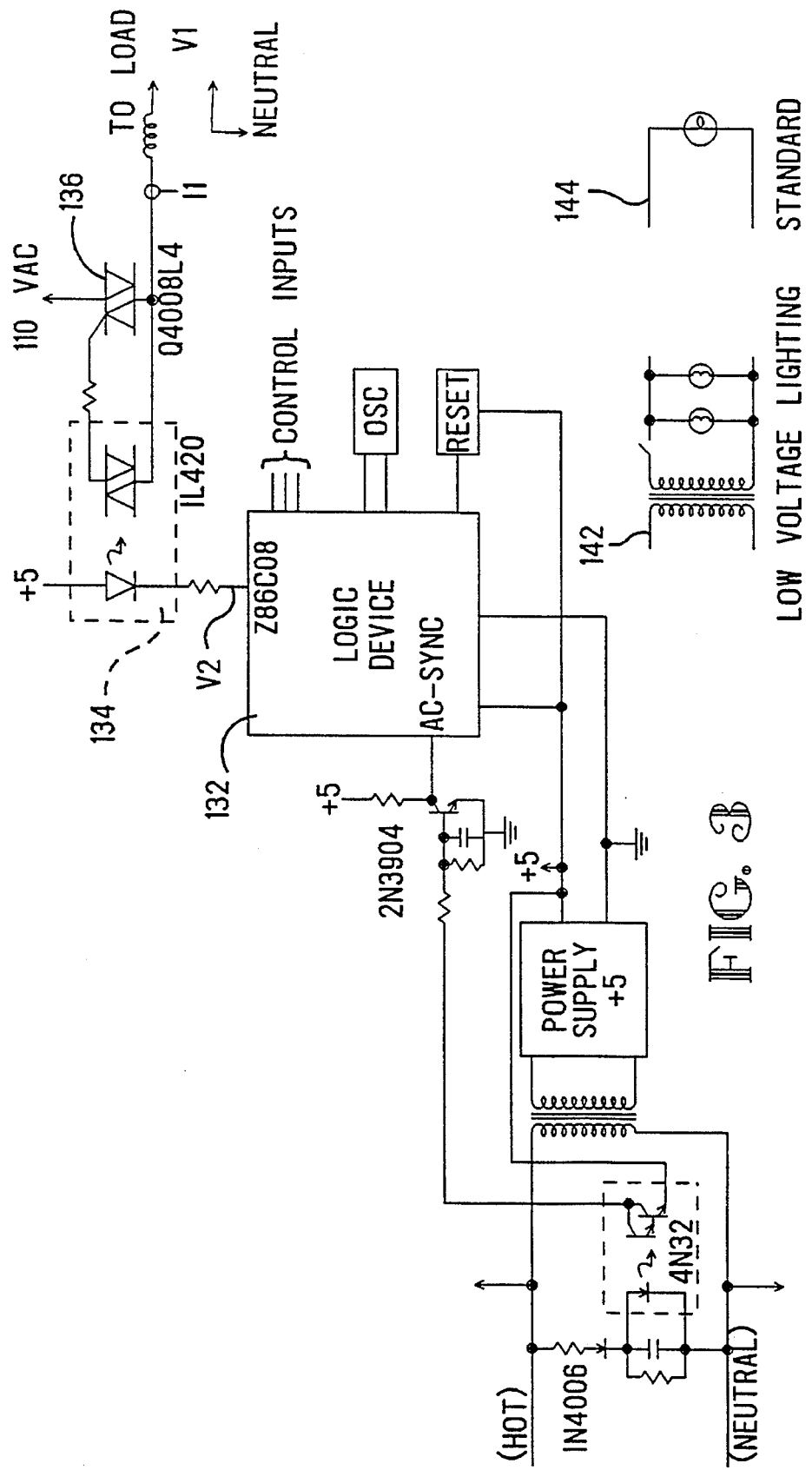
FIG. 3 is a schematic of a triac control circuit used to illustrate the action of a triac to control incandescent and inductive loads under several operating conditions.

With the aid of several oscilloscope traces, the manner in which a triac control circuit in accordance with this invention can be used to control both an incandescent and an inductive load will be detailed. These representative oscilloscope traces were generated using a slightly modified embodiment of the circuit described with reference to dimmer block 6A and the system with which that device is to be used. FIG. 3 is an electrical diagram illustrating this embodiment of a triac 136 and triac control circuit used for dimming both incandescent and inductive loads to generate these oscilloscope traces. AC line synchronization is achieved through the interaction of the 4N32 and 2N3904 circuits with input pin 9 of the Zilog Z86C08 microcontroller 132. The microcontroller provides drive pulses of varying widths to the main triac 136 through the IL420 optocoupler 134. These components are merely representative and other similar components can be employed. FIG. 3 shows two alternative load configurations used in the generation of these representative oscilloscope traces. A low voltage lighting load using a step down transformer is shown at 142 and a standard 250 Watt incandescent load is shown at 144.

The initial offset step relative to zero crossing of the AC line voltage is fixed at 1 millisecond. This represents a compromise between maximum brightness and circuit variables. It should be understood, however, that the invention is not limited to a circuit having an initial offset of 1 millisecond. Significantly this offset can be varied and the pulse width can also be altered depending upon the desired dimming percentage. The pulse width as a function of dimming percentage can be varied by the implemented software in the microcontroller. In the preferred embodiment of this invention, whenever the dim percentage are above 50%, the pulse width is 3 milliseconds. When dim percentages are less than 50%, the pulse width is 110 microseconds. Narrow pulses are necessary when very low intensities are desired and wide pulses are necessary at full ON conditions to compensate for characteristics of inductive loads.

Two specific load conditions will be discussed to more fully explain the manner in which this triac control circuit can be employed. Several wave forms will be described for these two different load conditions. In these waveforms, V1 is the dimmer output voltage applied to the load. I1 is the current through the load. V2 is the logical triac drive pulse. One load 142 is representative of a low voltage lighting system composed of a 120 VAC step down transformer and up to six 11 Watt 12 VAC light bulbs. The transformer output is rated at 12 VAC and can support lamp loads up to a maximum of 120 Watts. The condition in which the transformer, without secondary lamp loads, is connected to a dimmer is particularly troublesome for standard dimmers. A second load 144 is a standard 150 Watt 120 VAC light bulb.

Figure 4:
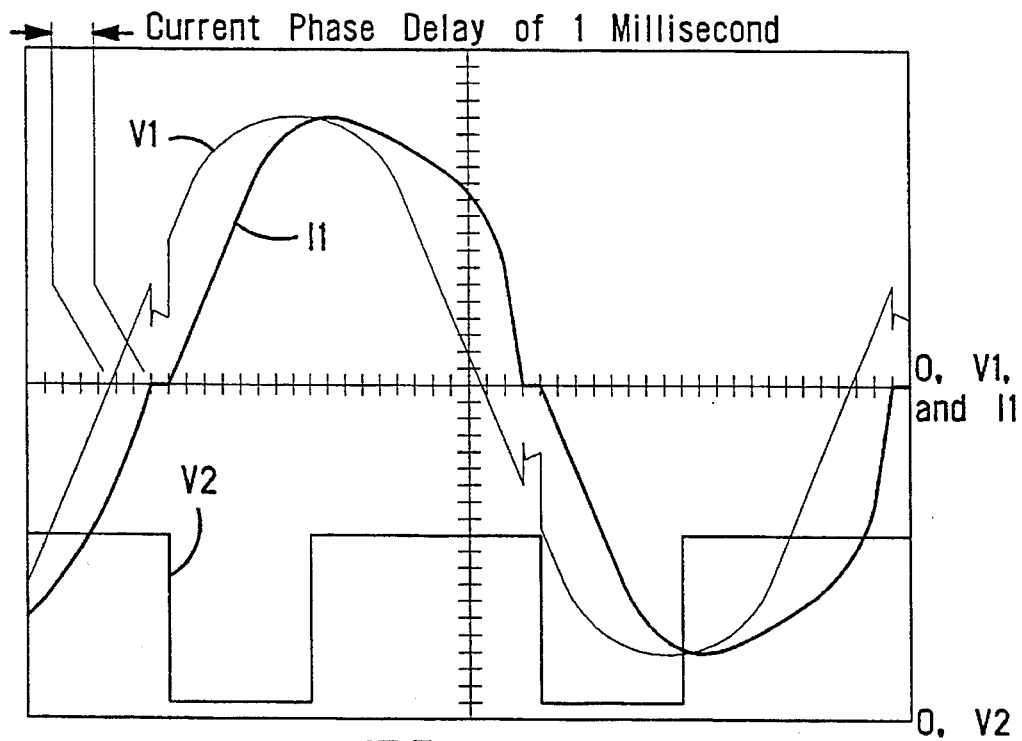
FIG. 4 is an oscilloscope trace showing the operation of the circuit of FIG. 3 with a low voltage system lamp load at full intensity.
Figure 5:
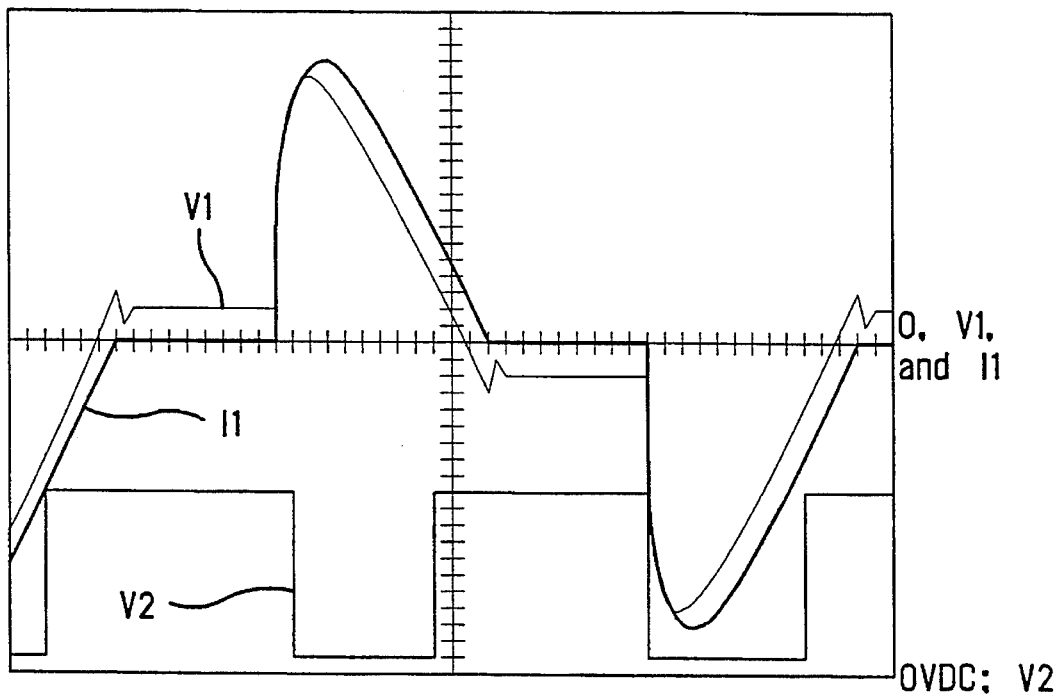
FIG. 5 is an oscilloscope trace showing the operation of the circuit of FIG. 3 with the low voltage system lamp load at 50% intensity.
Figure 6:
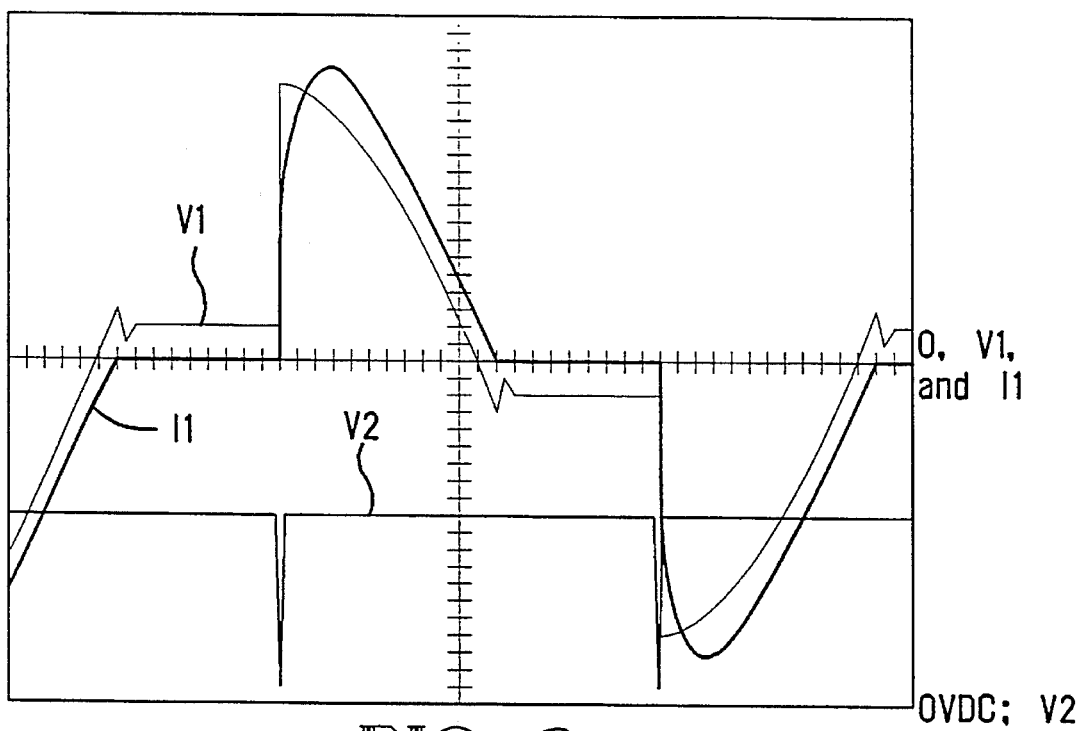
FIG. 6 is an oscilloscope trace showing the operation of the circuit of FIG. 3 with the low voltage system lamp load at 48% intensity.

FIGS. 4, 5, and 6 show waveforms when operating the low voltage light system as represented by load 142. FIG. 4 shows a waveform for Full On or a dimming percentage of 100% for the low voltage load 142. Figure 5 is a waveform for a dimming percentage of 50% for the low voltage load 142. FIG. 6 shows a dimming percentage of 48% for the low voltage load 142. Narrow pulses for the gate input must be used at low dimming percentages because wide pulses would allow the triac to fire as soon as the AC line voltage goes through zero-crossing.

Figure 7:
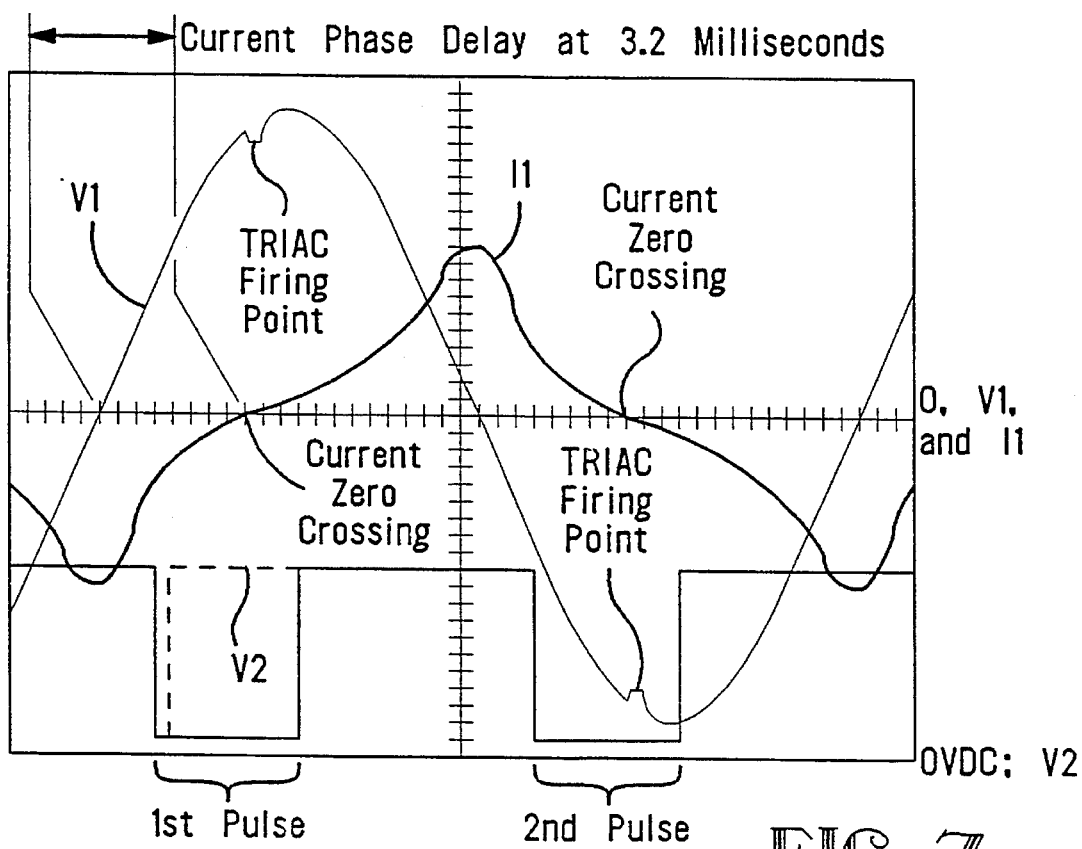
FIG. 7 is an oscilloscope trace showing the operation of the circuit of FIG. 3 at full intensity corresponding to the condition of FIG. 4, but with the lamps disconnected so that only the transformer is connected to the load side of the triac and triac control circuit.
Figure 8:
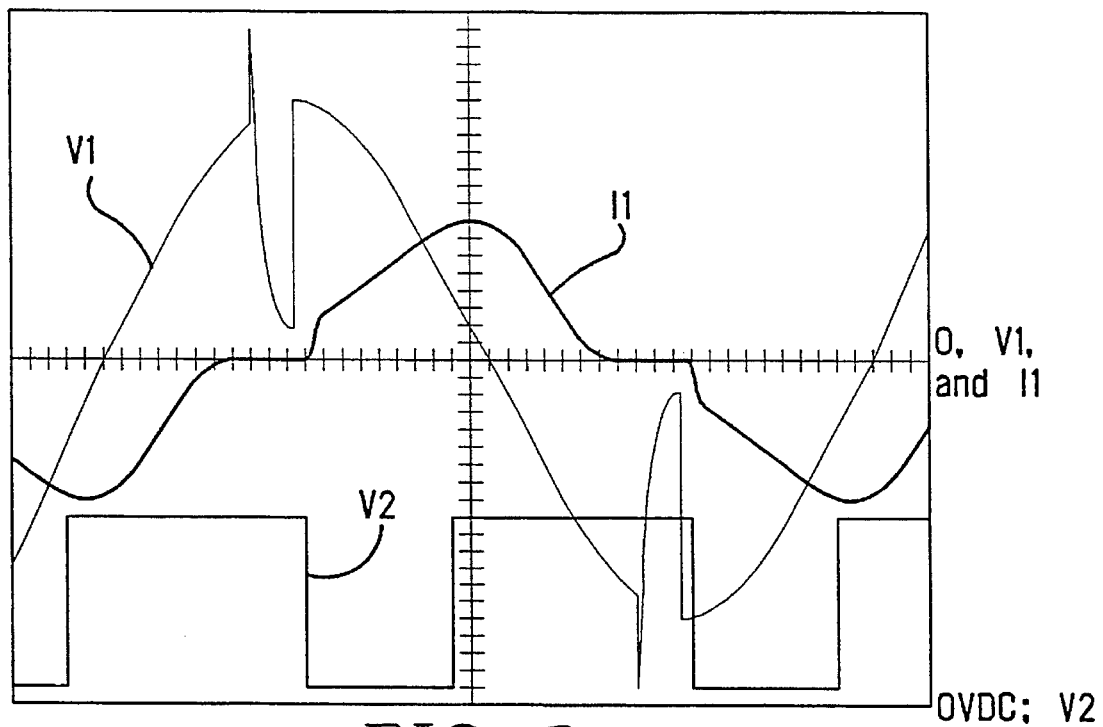
FIG. 8 is an oscilloscope trace showing the operation of the circuit of FIG. 3 at 50% intensity corresponding to the condition of FIG. 5, but with the lamps disconnected so that only the transformer is connected to the load side of the triac and triac control circuit.
Figure 9:
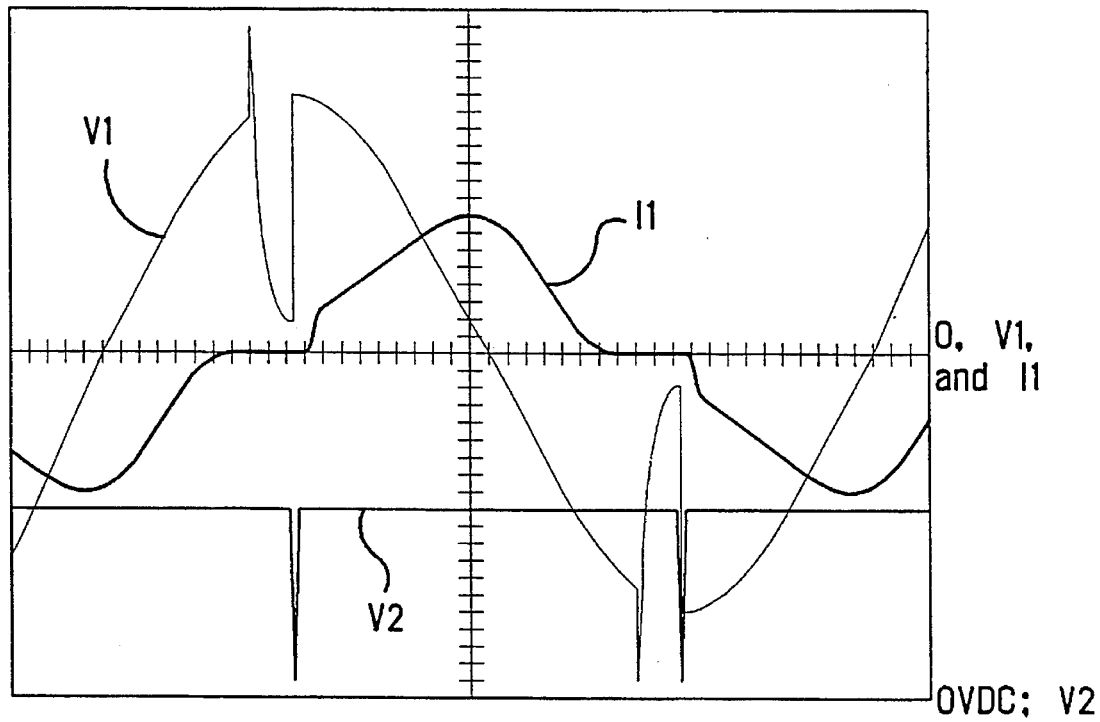
FIG. 9 is an oscilloscope trace showing the operation of the circuit of FIG. 3 at 48% intensity corresponding to the condition of FIG. 6, but with the lamps disconnected so that only the transformer is connected to the load side of the triac and triac control circuit.

FIGS. 7, 8, and 9 correspond to FIGS. 4, 5, and 6 respectively, but these waveforms depict the condition in which all low voltage bulbs have been removed from the secondary of the low voltage transformer. It is important to note that in FIG. 7, the active gate current drive exists at the current zero crossing point. Therefore, as soon as the current in the triac falls below what is called the "holding" current, the triac will stop conducting. However, as soon as the voltage rises above a few volts across the triac, it will refire because it continues to have a gate drive current.

Figure 10:
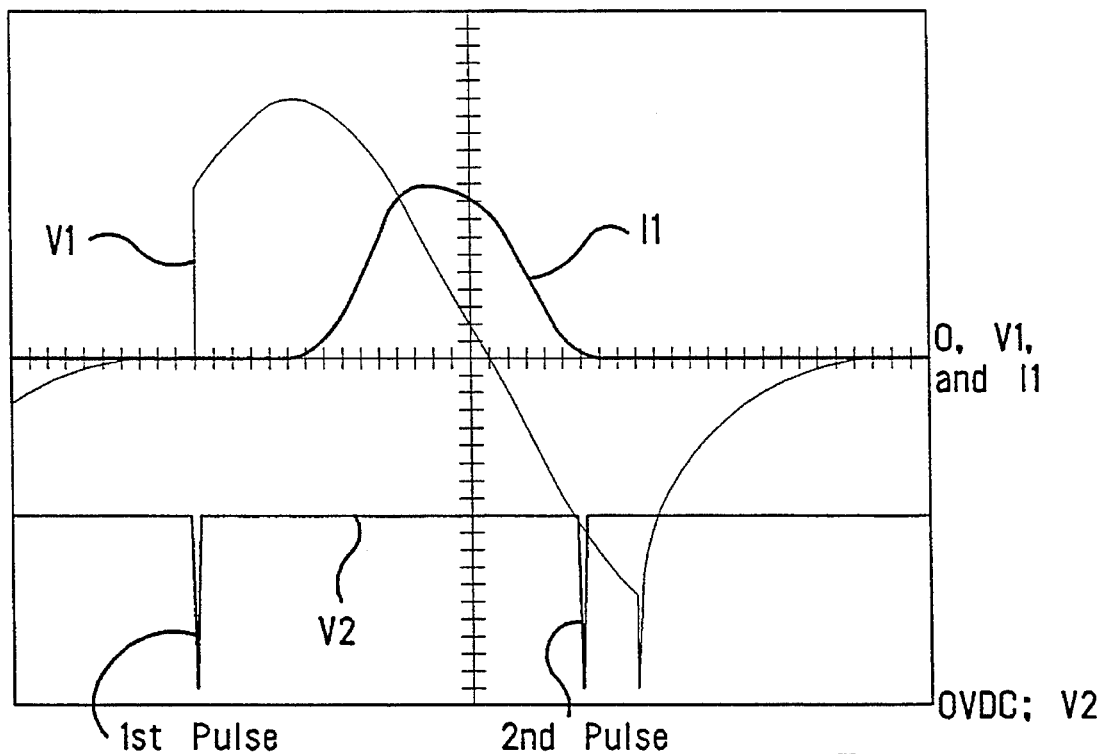
FIG. 10 is an oscilloscope trace showing the operation of a conventional dimmer with a low voltage system with the lamp disconnected so that only the transformer is connected to the load side of the triac and triac control circuit.

FIG. 10 illustrates what happens to a conventional triac dimmer. The second pulse occurs before the triac has turned fully OFF, therefore the triac is only activated on every other half AC line voltage cycle. Applying such a waveform to a transformer amounts to trying to drive the primary with pulsed DC. The result is excessive current. The primary current in this example is 3.2 Amps RMS compared to the current of FIG. 7 which is only 225 milliamps RMS. This increase in current by a factor of 15 will either destroy the triac in the dimmer or the primary of the transformer or both. The reason for this high current in the primary of the transformer can also be seen from FIG. 7. If the first pulse were a narrow pulse instead of a wide pulse, it would occur as depicted in the dotted lines. Thus the pulse to activate the Triac is over and gone before the current from the previous half cycle has gone to zero. From this it is easy to see why the current skips every other half cycle as is shown in FIG. 10.

Figure 11:
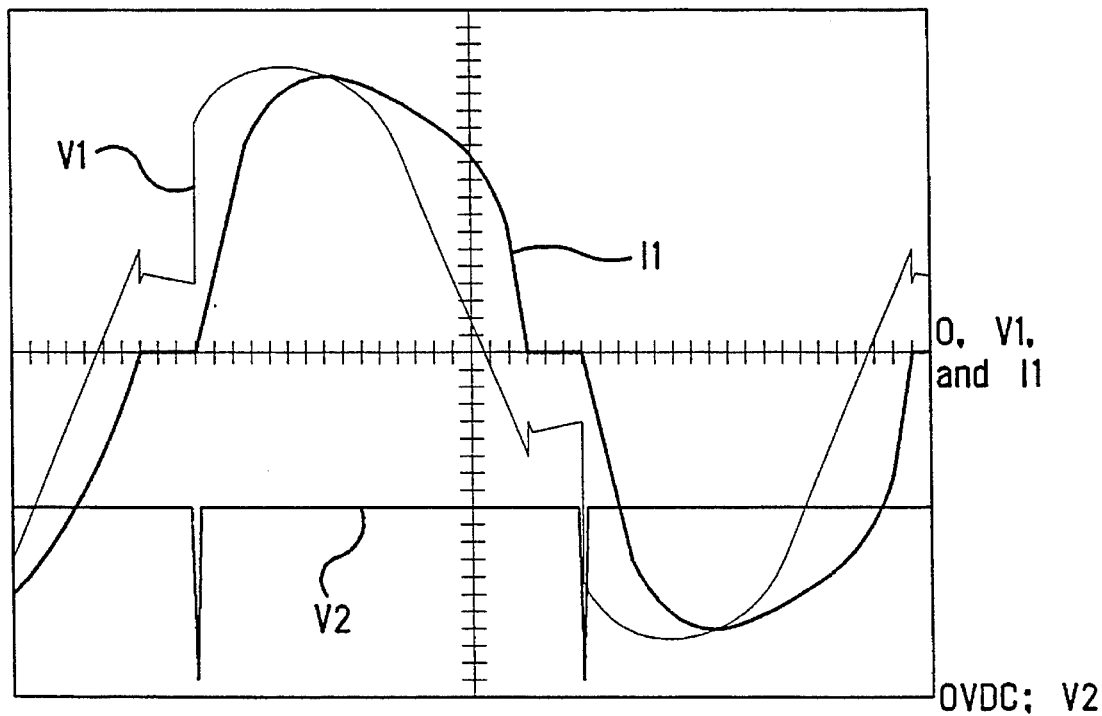
FIG. 11 is an oscilloscope trace showing the operation of a conventional dimmer with a low voltage system with the lamp at full intensity.

FIG. 11 shows a conventional triac drive system with a representative initial offset delay of 2 milliseconds. With this relatively large initial offset, the phase delay of the load current will not introduce the problem previously identified. The current has gone to zero from the previous half cycle before the full ON pulse occurs. However, if all lamps were burned out, the current phase delay would be much longer and the aforementioned problem would arise.

Figure 12:
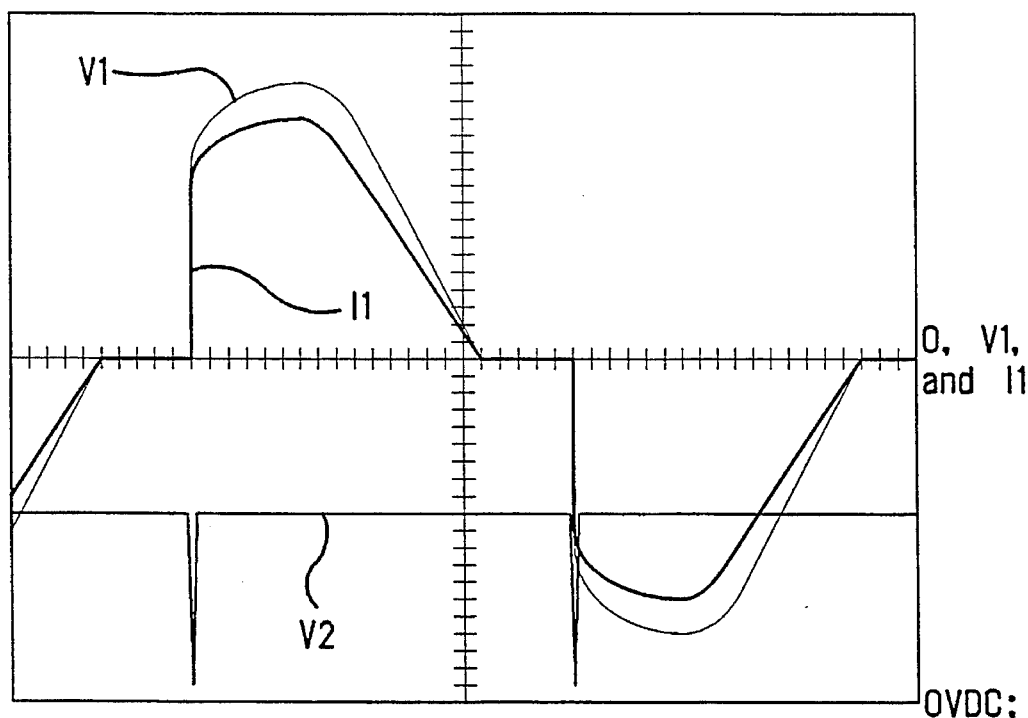
FIG. 12 is an oscilloscope trace showing typical drive signals for an incandescent lamp load at full intensity.
Figure 13:
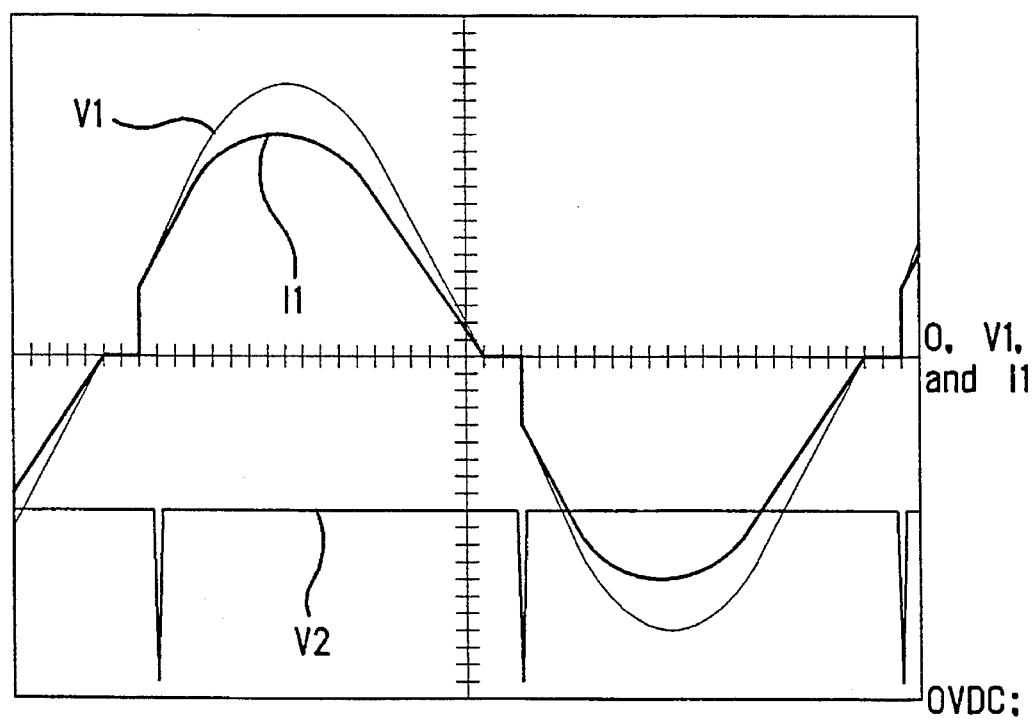
FIG. 13 is an oscilloscope trace showing typical drive signals for an incandescent lamp load with a 0.6 millisecond initial offset delay.

FIGS. 12 and 13 show typical drive signals with incandescent lamp loads. No problems occur with this type of load because there is no phase delay with the current. Therefore, the initial delay may be relatively short.

The problems identified in FIGS. 4–13 can be overcome by using the microcontroller to vary the gate pulse applied to the triac. In the preferred embodiment of this invention the microcontroller varies the duration of the gate pulse based upon the relative intensity desired. In the preferred embodiment, the pulse width is 3 milliseconds whenever the dim percentage is above 50%. When the dim percentage is below 50%, the pulse width is 110 microseconds.

This invention can be employed in various systems. Normally it would be used with a controller which would provide appropriate control signal input to the device employing this dimmer. It should be understood, however, that this invention could be employed in a dimmer switch which is not part of a system, but which is connected directly to an input switch and the device to be controlled. Although, a system which can employ a dimmer having the characteristics of this invention, has been previously described, other systems could also employ a device incorporating this dimming means. For example, the system to be described will employ separate signal conductors, over which control signals are transmitted to this dimming device. A dimming device incorporating this invention could however be used as part of a system in which control signals are transmitted as signals modulated on a powerline carrier. Powerline carrier systems which use the 120 VAC, 60 hertz transmitted over 12 AWG or 14 AWG conductors for distributing electrical power as the carrier on which the signals are impressed are commercially available. This invention could be employed with such powerline carrier systems. In addition, this invention could be employed with powerline carrier systems which use spread-spectrum type signals for transmitting control signals.

The microcontroller employed in the two circuits disclosed herein, as well as in equivalent circuits, provides a simple means for receiving an input signal from a system controller or directly from a hardwired switch which corresponds to a desired intensity level and then converting that input into an appropriate triac gate control signal which brings either inductive or incandescent loads directly to the desired intensity without the problems associated with conventional dimmers. The microcontroller can also be used to implement additional features in a dimmer. For example, the microcontroller can change the operating modes of the dimmer in response to simple inputs from a low voltage switch attached to the dimmer. Four operating modes incorporated into the dimmer block 6A can be described as follows.

Mode 1 is a mode in which the dimmer block 6A can respond directly to signals input by the system controller with which this dimmer block is used. For the system controller of the preferred embodiment, this mode means that the intensity of the dimmed fixture will first go to full on before going to the desired intensity level. Although considered less desirable, this mode is nevertheless available.

Mode 2 is a mode in which the initial change to full intensity is eliminated. This mode also permits the user to define the ramp rate.

Mode 3 is also a mode in which the initial intermediate full intensity state is eliminated. The microcontroller traps the signal sent by the system controller and locally calculates the desired dimming level. The dimmer then jumps to the desired level without going through any necessary intermediate state. This is the default mode for the preferred embodiment of this invention.

Mode 4 is a mode in which the dimmer goes from a full on state to a preset state in response to a momentary off input instead of going to off. In modes 1–4, the final intensity level will be the same, but the intermediate power levels will be changed in different manners, or different patterns or in different sequences.

Mode selection and ramp rate control can be invoked by a continuous series of six momentary switch depressions consisting of three momentary ON commands within 0.3 seconds followed immediately by three momentary OFF commands within 0.3 seconds. Once in the mode selection option, an LED on the switch will blink for the number times which correspond to the mode number. After the blinking stops, the number of momentary ON commands corresponds to a value to be entered into RAM on the microcontroller. Four pieces of information can be entered, each separated by a momentary OFF command. First the mode number is to be entered, followed by the ramp rate in seconds, followed by ramp rate in minutes, followed by the ramp rate in hours. The programming mode is terminated after 6 seconds without switch actuation or after four momentary OFF commands. If either Mode number value entry or all ramp rate values are skipped by using the OFF separator, the previous values remain unchanged.

The microcontroller used in dimmer block 6A can also store programmed dim percentages in a nonlinear fashion to achieve a true desired brightness level. Various factors such as higher filament resistance at lower light levels and lower efficiency of light output at low levels can be compensated for by varying the timing control. The dimmer can also be ramped nonlinearly by increasing the step size at high light levels and decreasing the step size at very low levels.

What is claimed is:

1. A dimmer for controlling the power delivered to a load from a source of line voltage and alternating current, comprising a triac having an input terminal, output terminal and a gate, the triac being responsive to triggering gate currents applied at selectable phase angles during each half cycle of the alternating current to deliver selectable amounts, corresponding to the phase angle at which the triggering gate current is applied, of proportional power to the load, the dimmer including a circuit which regulates the duration during which the triggering gate current is applied to the triac, said circuit being capable of applying triggering gate currents of different durations to said triac.

2. The dimmer of claim 1 wherein the circuit varies the duration during which the triggering gate current is applied as a function of the phase angle at which the triggering gate current is applied.

3. The dimmer of claim 1 wherein the circuit varies the duration during which the triggering gate current is applied as a function of the proportional amount of power applied to the load.

4. The dimmer of claim 3 wherein the circuit varies the duration during which the triggering gate current is applied for a greater duration when a greater proportional amount of power is applied to the load.

5. The dimmer of claim 4 wherein the circuit varies the duration during which the triggering gate current is applied for a first constant interval when less than one-half of the power applied to an input of the triac is delivered to the load and applies the current for a second constant longer interval when more than one-half of the power applied to the input of the triac is delivered to the load.

6. The dimmer of claim 1 wherein the circuit varying the duration during which the triggering gate current is applied comprises a microprocessor.

7. The dimmer of claim 6 further comprising a zero crossing circuit.

8. The dimmer of claim 6 wherein the microprocessor is responsive to a series of short or long signal inputs to select alternate modes for changing the intensity of the load.

9. The dimmer of claim 6 wherein the microprocessor is programmed to correct for nonlinear characteristics of the load.

10. The dimmer of claim 1 wherein the triac is mounted in a block having first terminals for attaching the block to conductors connected to the source, second terminals for attaching the block to conductors connected to the load and third terminals for attaching the block to signal conductors attached to a remote controller.

11. A dimmer for use in controlling AC electrical power received from a supply and delivered to a fixture comprising:

a zero crossing detector to determine the time when AC line voltage from the supply is zero;

a microcontroller in the dimmer configured to output a gate control signal corresponding to the intensity level to which the fixture is to be dimmed, the zero crossing detector being connected as an input on the microcontroller;

a triac in the dimmer activated by the gate control signal output from the microcontroller as a function of the zero crossing time of the AC line voltage, so that the power delivered by the dimmer to the load corresponds to the intensity level to which the fixture is to be set; and input means to the microcontroller at which first control signals characteristic of the intensity level to which the fixture is to be dimmed and second control, signals for changing the operational mode of the microcontroller are received, the microcontroller controlling the triac so that the dimmer changes the intensity level of the fixture in a different manner in response to identical first control signals for different operational modes.

12. The dimmer of claim 11 wherein the input means comprise first and second input means, only the first input means being connected directly to an input port of the microcontroller.

13. The dimmer of claim 12 wherein the second input means is connected to an interface means, the interface means being responsive to a system controller, the interface means outputting third control signals corresponding to the intensity level to which the dimmed fixture is to be set, the third control signals being input into the microcontroller.

14. The dimmer of claim 13 wherein the second control signals are input to the microcontroller at the second input means and not through the interface means.

15. The dimmer of claim 11 wherein the microcontroller alters the duration of the gate control signal as a function of the intensity level to which the fixture is to be set.

16. A system for controlling the delivery of AC electrical power to fixtures, the system comprising:

a system controller:

a plurality of branches, each branch including AC electrical power conductors and signal conductors, the system controller transmitting control signals on the signal conductors;

a dimmer block on at least one branch, the AC electrical power conductors and the signal conductors on the branch being connected to the dimmer block; the dimmer block further comprising a branch interface to which the signal conductors transmit input signals from the system controller adapted to cause the power to be delivered to a fixture attached to the dimmer block in a first pattern, and a triac, both the branch interface and the triac being connected to a microcontroller, the microcontroller conditioning the signals received by the branch interface into gate control signals for activating the triac so that the power is delivered to the fixture different from the first pattern, the final power delivery state of the fixture being the same for both the first pattern and the second pattern.

17. The system of claim 16 further comprising a low voltage switch attached to the dimmer block and transmitting input signals directly to the microcontroller, the microcontroller changing the operational mode of the dimmer block in response to a specified set of pulses received from the low voltage switch so that the dimmer block responds to signals received from the low voltage switch and through the branch interface in different ways dependent upon the operational mode.

18. The system of claim 16 wherein the microcontroller controls the gate pulse applied to the triac so that the duration of the gate pulse is a function of the relative amount of power to be delivered to the fixture.

19. The system of claim 16 wherein the microcontroller controls the gate pulse applied to the triac so that the gate pulse is applied to the fixture when a holding current is present in the triac for inductive fixture loads.

20. The system of claim 16 wherein the dimming percentages are stored in the microcontroller in a nonlinear manner so that equal incremental dimming inputs will linearly change the intensity of light emitted by a light fixture attached to the dimmer block.

21. A dimmer for controlling the power delivered to an inductive load from a source of line voltage and alternating current, comprising a triac having an input terminal, output terminal and a gate, the triac being responsive to triggering gate currents applied at selectable phase angles during each half cycle of the alternating current to deliver selectable amounts, corresponding to the phase angle at which the triggering gate current is applied, of "proportional power" to the load, the dimmer including means for generating a first triggering gate current having a first duration to be applied to the gate of the triac for power levels to be applied to the load in a first range and for generating a second triggering gate current, having a second duration longer than the first duration of the first triggering gate current, to be applied to the gate of the triac for power levels to be applied to the load in a second range, exceeding the power levels in the first range.

\* \* \* \* \*